(12) United States Patent
Kitahara et al.

(10) Patent No.: US 6,954,273 B2
(45) Date of Patent: Oct. 11, 2005

(54) LASER-BASED MEASURING APPARATUS FOR MEASURING AN AXIAL RUN-OUT IN A CYLINDER OF ROTATION AND METHOD FOR MEASURING THE SAME UTILIZING OPPOSING INCIDENT MEASURING LIGHT BEAMS

(75) Inventors: Hiroaki Kitahara, Tsurugashima (JP); Yoshiaki Kojima, Tsurugashima (JP); Yasumitsu Wada, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 378 days.

(21) Appl. No.: 10/043,260

(22) Filed: Jan. 14, 2002

(65) Prior Publication Data

US 2002/0109849 A1 Aug. 15, 2002

(30) Foreign Application Priority Data

Jan. 18, 2001 (JP) ......................................... 2001-10113

(51) Int. Cl.$^7$ ............................................... G01B 9/02
(52) U.S. Cl. ....................................... 356/486; 356/487
(58) Field of Search ................................ 356/486, 487, 356/493, 498, 500, 503, 505

(56) References Cited

U.S. PATENT DOCUMENTS

| 2,841,049 | A | * | 7/1958 | Scott | ........................... 356/508 |
| 4,334,778 | A |   | 6/1982 | Pardue et al. | ................ 356/349 |
| 4,930,894 | A | * | 6/1990 | Baldwin | ....................... 356/485 |
| 5,220,405 | A |   | 6/1993 | Barbee et al. | ............... 356/357 |
| 5,579,109 | A |   | 11/1996 | Suh et al. | .................... 356/349 |
| 5,675,412 | A | * | 10/1997 | Solomon | ...................... 356/450 |
| 6,271,924 | B1 | * | 8/2001 | Ngoi et al. | .................. 356/489 |

OTHER PUBLICATIONS

Kloos, G., "Design of a Michelson interferometer for the measurement of electrostrictive strains," Optics & Laser Technology, vol. 28, No. 6, Sep. 1, 1996, pp. 481–484.

* cited by examiner

*Primary Examiner*—Samuel A. Turner
(74) *Attorney, Agent, or Firm*—Morgan Lewis & Bockius LLP

(57) ABSTRACT

A laser-based measuring apparatus divides a light beam from a laser light source into at least two light beams, passes the light beams through different optical paths from each other, recombines the light beams, has the light beams interfere with each other to generate interfered light, optoelectrically transduces the interfered light to an optical frequency, and measures the amount of travel of an object which changes an optical path length of a portion of an optical path based on the optical frequency. The measuring apparatus has a portion for generating at least two measuring light beams from the laser light source, two reflection planes included in an object moving on a measuring axis, arranged back-to-back to each other on the measuring axis, and an opposing incident optical system for directing the measuring light beams into the reflection planes, respectively, such that the measuring light beams oppose to each other on the measuring axis.

6 Claims, 10 Drawing Sheets

LASER-BASED MEASURING APPARATUS FOR MEASURING AN AXIAL RUN-OUT IN A CYLINDER OF ROTATION AND METHOD FOR MEASURING THE SAME UTILIZING OPPOSING INCIDENT MEASURING LIGHT BEAMS

BACKGROUND OF THE INVENTION

1. Field of the Invention

The present invention relates to a laser-based measuring apparatus and a method for measuring the length or distance of an object under measurement.

2. Description of the Related Art

An interferometer has been applied in measuring technology. The interferometer divides light from a laser light source into at least two coherent light beams, passes the divided light beams through different optical paths from each other, and makes the resultant light beams optically interfere with each other after recombination.

Measurements of length utilizing light waves are classified into a coincidence method which observes interference fringes at both ends of an object under measurement to measure the length of the object, and a counting method which employs an interferometer having a movable measuring reflector which is moved from a start point to an end point of a length under measurement to count bright and dark regions in interference fringes generated therebetween. The counting method is implemented in a laser-based measuring apparatus using a laser light source, which is widely employed for precise length measurements.

FIG. 1 illustrates the configuration of a laser-based measuring apparatus (linear interferometer) for the most basic two-wavelength type moving interferometer. A He—Ne laser, which is a laser light source, applies a magnetic field to a discharger to emit coherent light having two frequency components $f_1$, $f_2$, which are slightly different in frequency, by the action of Zeeman effect. The light beam components have planes of polarization orthogonal to each other such that two circularly polarized light beams are emitted in rotating directions opposite to each other. The two frequency components $f_1$, $f_2$ are both stabilized. The light beams are separated into two in the laser light source, and one of the light beams is opto-electrically transduced directly by a photodetector within the light source to output a beat signal at $f_1-f_2$ as an electric reference signal, while the other light beam having the components $f_1$, $f_2$ is output from the light source and enters an interferometer.

The light beam entering the interferometer is separated into two having the respective frequency components by a polarization beam splitter. One of the light beams, $f_1$ is emitted to a measuring reflector attached to a moving object, such as a corner cube prism, for example, and reflected thereby to become measuring light. The other light beam $f_2$ is reflected by a fixed reference reflector to become reference light. The resulting light beams are combined again by a polarization beam splitter, i.e., interfere with each other. A relative movement between the beam splitter and the measuring reflector causes the frequency of the measuring light to change by $\Delta f$ due to the Doppler effect. In other words, with addition of a Doppler component, the light component $f_1$ changes to $f_1\pm\Delta f$. Light beams, which interfere with each other in the beam splitter, are opto-electrically transduced by a photodetector, and a signal to be measured $f_1-(f_2\pm\Delta f)$ of a biased beat signal is generated as the difference of optical frequency by heterodyne detection. A measuring circuit only calculates $\pm\Delta f$ which is the difference between the signal to be measured $f_1-f_2\pm\Delta f$ and the reference signal $f_1-f_2$ of the laser light source, and is converted to position information. Specifically, a frequency counter in the measuring circuit calculates a difference in count between the signal to be measured and the reference signal. This difference is multiplied by one half of the wavelength of the light beam to derive a moving distance of the measuring reflector with respect to the beam splitter.

Further, a technique for increasing the resolution of a laser measuring apparatus is implemented in a two-pass interferometer and a four-pass interferometer which pass the measuring light through an optical path between a beam splitter and a measuring reflector a plurality of times to increase a Doppler component for increasing the resolution.

FIG. 2 illustrates the configuration of a two-pass interferometer which optically improves the resolution of a laser-based measuring apparatus.

The two-pass interferometer employs a polarization beam splitter; a corner cube prism and a reference plane mirror opposing each other with the polarization beam splitter and optical axis interposed therebetween; and two quarter wavelength plates positioned on the optical axis and between the polarization beam splitter and corner cube prism. The plane mirror is used as a measuring reflector.

Two light beams at frequencies $f_1$, $f_2$ having orthogonal planes of polarization, emitted from a laser light source, are separated by the polarization beam splitter. One of the light beams having the component $f_1$ is reflected by the polarization beam splitter and bent by 90 degrees, passes through the quarter wavelength plate, is reflected back by the fixed reference plane mirror, and again passes through the quarter wavelength plate. Therefore, since the plane of polarization of the reference light rotates by 90 degrees, the reference light again travels via the polarization beam splitter to the corner cube prism. The reference light folded back by the corner cube prism goes to the beam splitter, and is reflected again by the reference plane mirror. In this event, since the reference light passes through the quarter wavelength plate twice, the reference light is reflected and bent by the beam splitter at the second time, and returns toward the light source and impinges on a photodetector.

The other light beam having the component $f_2$ goes to the beam splitter from the laser light source, and is reflected by the plane mirror functioning, and returns to the beam splitter as the measuring reflector. At this time, since the measuring light has passed through the quarter wavelength plate twice, the measuring light is reflected and bent by the beam splitter at the second time to reach the corner cube prism, folded back by the corner cube prism, and bent by the beam splitter, so that the measuring light again directs to the plane mirror which functions as the measuring reflector. The measuring light reflected by the plane mirror functioning as the measuring reflector and returning to the beam splitter, travels via the beam splitter, and returns to the light source, and impinges on the photodetector at this time, since its plane of polarization has rotated.

Therefore, the measuring light reciprocates twice between the interferometer and the measuring reflector to generate the Doppler component $\pm2\Delta f$, so that the resolution is increased twice as high as that of the linear interferometer.

The four-pass interferometer has increased lengths of optical paths for reference light and measuring light, twice as long as those of the two-pass interferometer, so that the four-pass interferometer comprises one each of additional beam bender and corner cube prism for correspondingly increasing the lengths of optical paths for the reference light and measuring light. Since the measuring light reciprocates four times between the interferometer and measuring reflector, the measurement resolution is increased four times as high as that of the linear interferometer.

The two-pass interferometer and four-pass interferometer, which are techniques for increasing the resolution of laser measuring apparatuses, is provided with optical paths for an increased number of optics, and is configured to direct two or four light beams perpendicularly to a measuring plane mirror, a plane mirror having a relatively large diameter must be attached to an object under measurement. Therefore, these interferometers cannot be used when a small measuring reflective plane is measured due to a limited space, or when a measuring reflective plane is not plane, such as cylindrical, spherical and the like.

OBJECT AND SUMMARY OF THE INVENTION

The present invention has been made in view of the foregoing circumstance, and it is an object of the invention to provide a laser measuring apparatus and method which are capable of optically doubling the measurement resolution in a simple optical configuration, irrespective of which types of interferometer and reflector are used.

A laser-based measuring apparatus of the present invention divides a light beam from a laser light source into at least two light beams, passes the light beams through different optical paths from each other, recombines the light beams, has the light beams interfere with each other to generate interfered light, opto-electrically transduces the interfered light to an optical frequency, and measures the amount of travel of an object which changes an optical path length of a portion of an optical path based on the optical frequency. The measuring apparatus comprises:

a portion for generating at least two measuring light beams from the laser light source;

two reflection planes included in an object moving on a measuring axis, arranged back-to-back to each other on the measuring axis; and an opposing incident optical system for directing the measuring light beams into the reflection planes, respectively, such that the measuring light beams oppose to each other on the measuring axis.

In one aspect of the laser-based measuring apparatus according to the invention, said reflection planes comprise reflectors mounted on the object.

In another aspect of the laser-based measuring apparatus according to the invention, said object is a cylinder having an axis of rotation orthogonal to said measuring axis, and said reflection planes are side surfaces of said cylinder opposing to each other on a diameter.

In a further aspect of the laser-based measuring apparatus according to the invention, said measuring apparatus comprises a plurality of said opposing incident optical systems.

A laser-based measuring method according to the invention is used for measuring an amount of travel of an object which changes an optical path length of a portion of an optical path based on an optical frequency. The optical frequency is obtained by dividing a light beam from a laser light source into at least two light beams, passing the light beams through different optical paths from each other, recombining the light beams, having the light beams interfere with each other to generate interfered light, and opto-electrically transducing the interfered light to the optical frequency. The measuring method comprises the steps of:

setting two reflection planes included in an object moving on a measuring axis, such that said two reflection planes are arranged back-to-back to each other on said measuring axis;

generating at least two measuring light beams from a laser light source; and directing said measuring light beams into said reflection planes, respectively, such that said measuring light beams oppose to each other on said measuring axis.

In one aspect of the laser-based measuring method according to the invention, said reflection planes comprise reflectors mounted on the object.

In another aspect of the laser-based measuring method according to the invention, said object is a cylinder having an axis of rotation orthogonal to said measuring axis, and said reflection planes are side surfaces of said cylinder opposing to each other on a diameter.

In a further aspect of the laser-based measuring apparatus according to the invention, a plurality of opposing incident optical systems are provided.

The displacement of object's movement is measured by the interference of light reflected by the fixed reference reflector with light reflected by the movable measuring reflector mounted on the moving object in the conventional laser-based measuring apparatus. In contrast, according to the invention, the laser-based measuring apparatus eliminates a fixed reference reflector, and arranges two reflectors or reflection planes in a back-to-back relationship to each other on a measuring axis of a moving object, such that the measuring apparatus directs two light beams split by a polarization beam splitter of an interferometer into the two reflectors from opposite directions, and differentially measures a relative displacement from the polarization beam splitter to the back-to-back arranged reflector pair to double a detected displacement, thereby making it possible to increase the measuring resolution twice as high as the conventional configuration.

DETAILED DESCRIPTION OF THE PREFERRED EMBODIMENTS

In the following, a laser-based measuring apparatus according to one embodiment of the present invention will be described with reference to the drawings.

Figure 1:
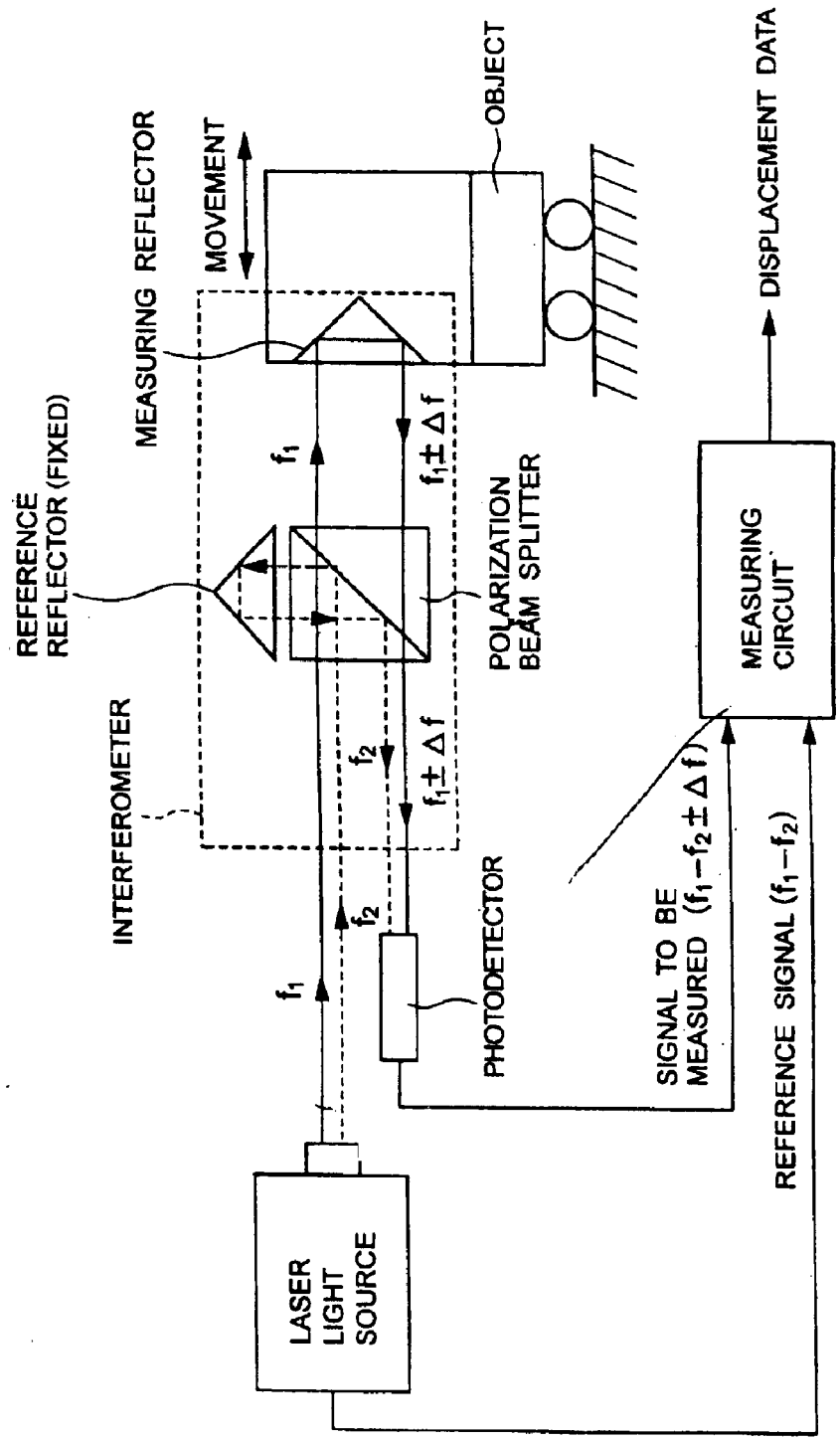
FIGS. 1 and 2 are schematic diagrams for explaining a conventional laser-based measuring apparatus.
Figure 2:
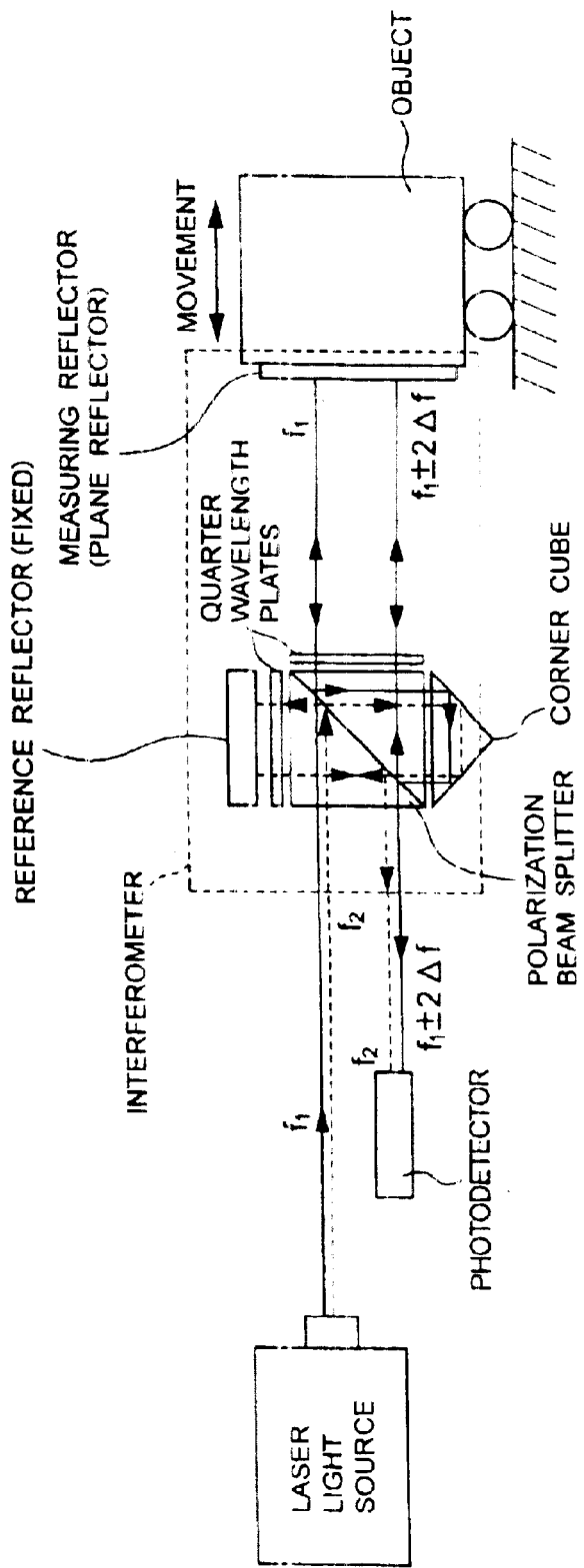
Figure 3:
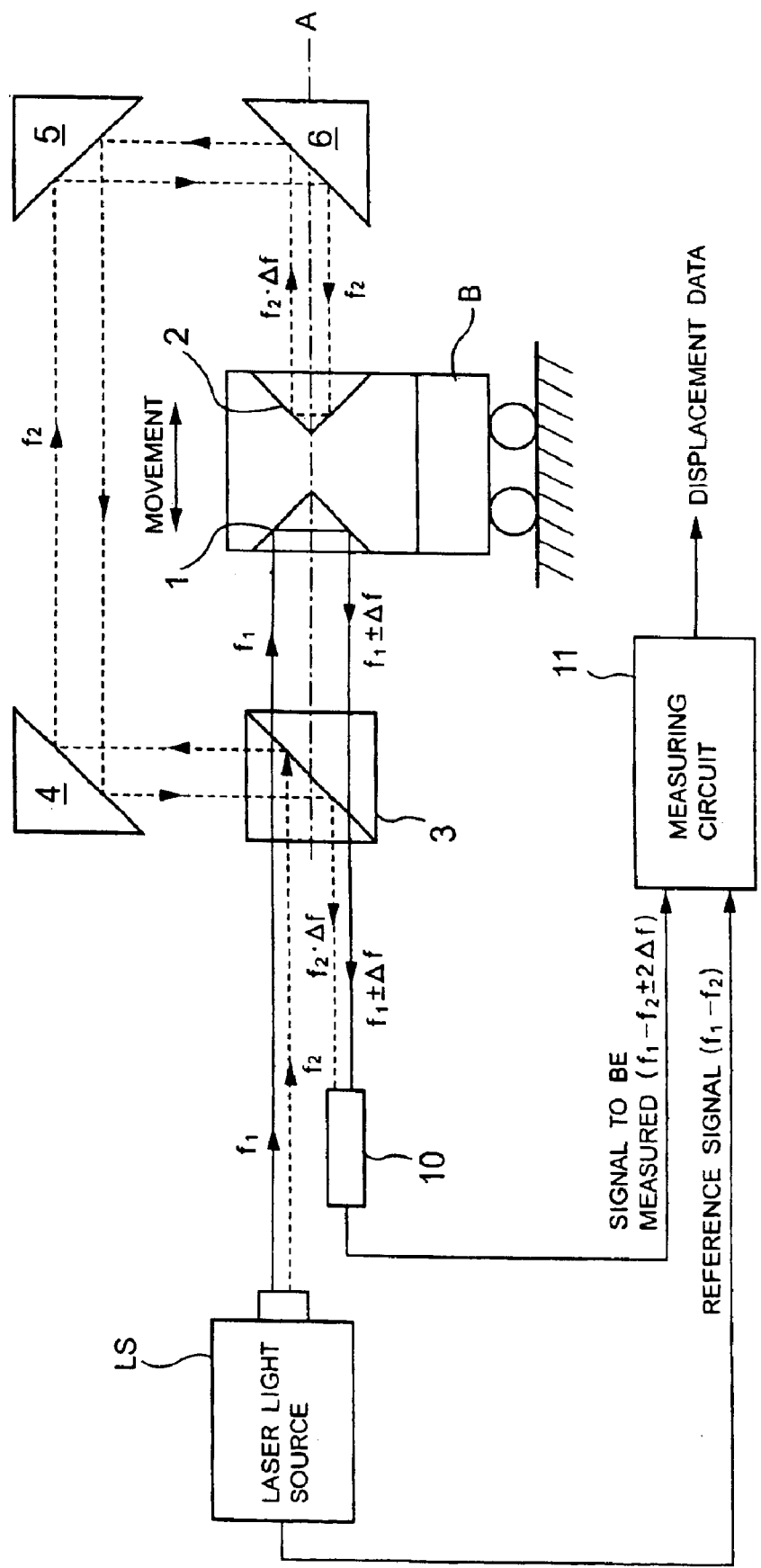
FIG. 3 is a schematic diagram for explaining a laser-based measuring apparatus according to one embodiment of the present invention.

FIG. 3 illustrates the configuration of a linear interferometer to which a differential measurement is applied in accordance with the laser-based measuring apparatus of the embodiment. The laser-based measuring apparatus comprises a linear interferometer and a laser light source LS e.g., He—Ne laser. The linear interferometer comprises a polarization beam splitter 3; an optical system made up of two reflectors 1, 2 positioned on a measuring axis A of an object B in a back-to-back relationship to each other; and beam benders (45-degree reflectors) 4, 5, 6 which are positioned such that two light beams $f_1$, $f_2$ separated by the polarization beam splitter 3 are incident on the two reflectors 1, 2 from opposite directions to each other. The two light beams $f_1$, $f_2$ from the laser light source LS having different frequency components are separated by the polarization beam splitter 3. The two light beams $f_1$, $f_2$ incident on the reflectors 1, 2 from the opposite directions experience a change in frequency due to the Doppler effect, return along their respective optical paths, and interfere with each other in the polarization beam splitter 3. The interfering reflected light is opto-electrically transduced by a photodetector 10, and a signal to be measured $f_1-(f_2\pm2\Delta f)$ of a biased beat signal is generated by heterodyne detection. A measuring circuit 11 connected to the photodetector 10 calculates only $\pm2\Delta f$ which is the difference between the signal to be measured $f_1-f_2\pm2\Delta f$ and a reference signal $f_1-f_2$ from a laser light source LS, and is converted to position information. Thus, the Doppler components of the light beam $f_1$ reflected by the reflector 1 have the same positive and negative frequency components as the Doppler components of the light beam $f_2$ reflected by the reflector 2, so that the signal to be measured is expressed by $f_1-f_2\pm2\Delta f$. Therefore, the linear interferometer of this embodiment has an optical displacement sensitivity and a measuring resolution twice as high as those of a conventional linear interferometer.

Stated another way, the linear interferometer configured as described above uses two opposing measuring light beams on a common axis, and differentially measures a relative displacement from the polarization beam splitter 3 to the reflector 1, and a relative displacement from the polarization beam splitter 3 to the reflector 2. Then, since the moving displacements of the object appear in the phase opposite, the difference between the two relative displacements becomes twice as much as the moving displacement of the object. This results in the resolution twice as high. It should be noted that from requirements to satisfy a condition of vertical reflection at all time, the measuring reflector may be implemented by a corner cube prism or a cat's eye which is a prism that forces reflected light, even changing in orientation, to return in parallel with incident light. The corner cube prism is a tetrahedral prism in the shape of a regular hexahedron having corners cut obliquely. The corner cube prism has an inclined reflecting surface, and the property of returning light incident from the incline correctly in the opposite direction irrespective of the incident angle. The cat's eye is a combination of a convex lens and a plane mirror to have a similar property to the corner cube prism.

The present invention can be widely applied irrespective of the type of interferometer and the type and size of reflector as long as measuring light can be directed opposite to a measuring axis and reflected.

Figure 4:
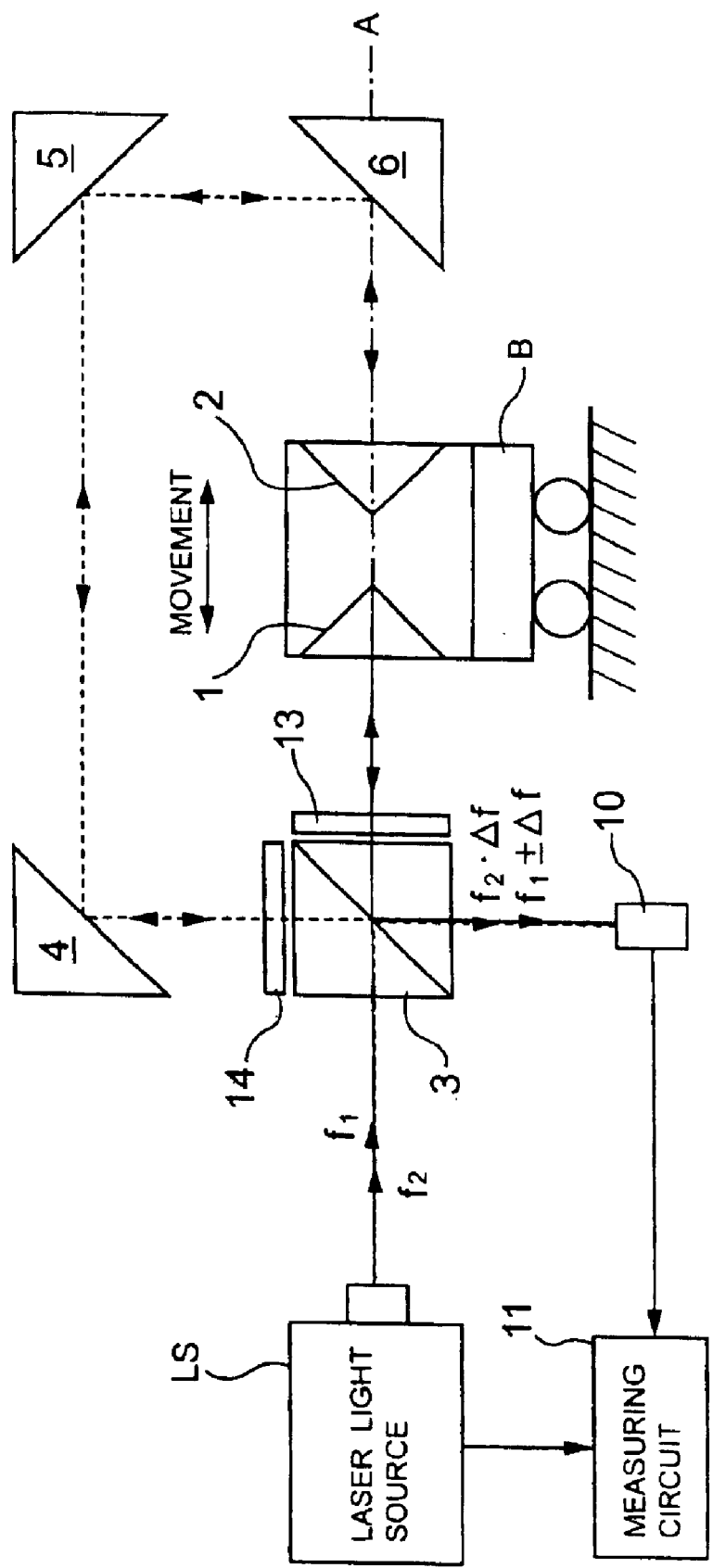
FIGS. 4 through 10 are schematic diagrams for explaining laser-based measuring apparatuses according to other embodiments of the present invention.
Figure 5:
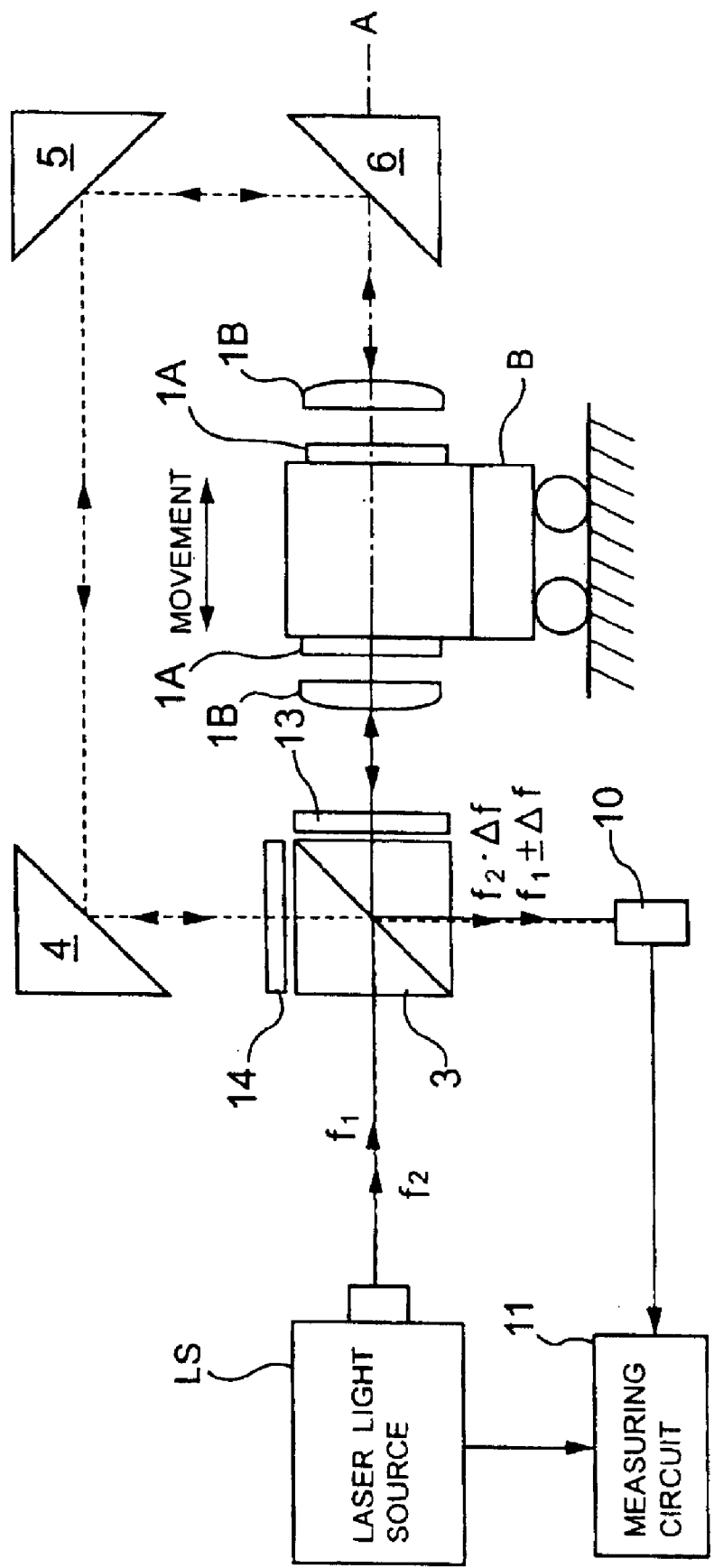

For example, FIG. 4 illustrates the configuration of a single beam interferometer to which the present invention is applied. The single beam interferometer adds two quarter wavelength plates to a linear interferometer, and is configured such that both measuring light beams pass along one axis, respectively, near the center of the interferometer. When the single beam interferometer is used, ongoing and returning light beams pass along the same optical path, so that a measurement can be made with a small reflector. Alternatively, the reflector may be comprised of a cat's eye (a mirror 1A and a convex lens 1B) which converges measuring light by the lens 1B, as illustrated in FIG. 5, in which case the reflection plane is not limited to be planar but measurements can be made even with a cylindrical surface, a spherical surface, and the like, so that the resulting single beam interferometer has wider applications. With the corner cube prism, the reflection plane is positioned at the center of the corner cube prism.

Two light beams $f_1$, $f_2$ having different frequency components entering the interferometer from a laser light source LS are separated by a polarization beam splitter 3. One of the light beams, $f_1$ goes to the polarization beam splitter 3, and is reflected by a reflector 1 to return back to the polarization beam splitter 3. Meanwhile, the light beam $f_1$ passes through a quarter wavelength plate 13 twice, so that the returning light beam is bent by the polarization beam splitter 3 by 90 degrees and enters a photodetector 10. The other light beam $f_2$ is first bent by the polarization beam splitter 3, led to a reflector 2 on the opposite side by three beam benders 4, 5, 6, and reflected by the reflector 2, and subsequently returns along the same optical path, so that the light beam $f_2$ passes through a quarter wavelength plate 14 twice. Thus, the returning light beam travels through the polarization beam splitter 3 and enters the photodetector 10. Consequently, the single beam interferometer of this embodiment provides the displacement sensitivity and resolution twice as high as conventional linear interferometer and single beam interferometer.

It is further possible to enhance, for example, the resolution of a two-pass interferometer four times as high as a conventional linear interferometer, enhance the resolution of a four-pass interferometer eight times as high as a conventional linear interferometer, and the like.

Figure 6:
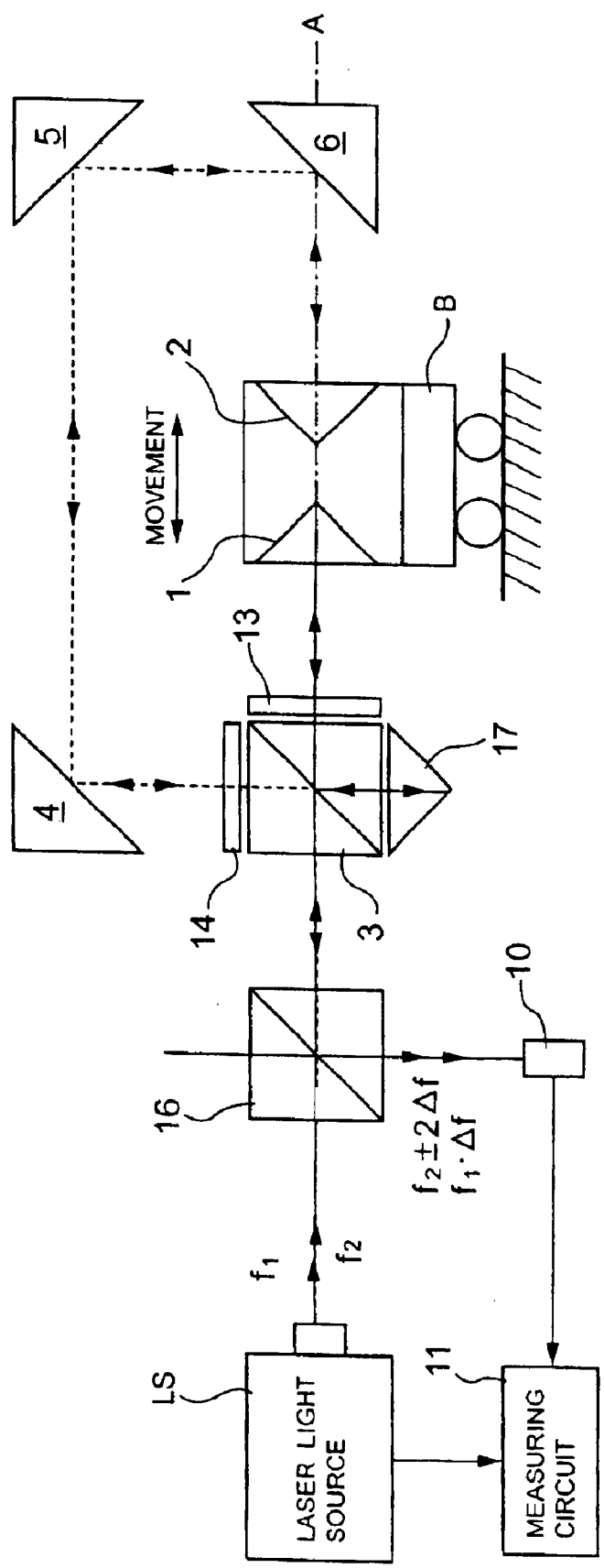

FIG. 6 illustrates the configuration of a single beam two-pass interferometer, modified from the single beam interferometer of FIG. 4, for making a differential measurement. Two light beams $f_1$, $f_2$ having different components, emitted from a laser light source LS, pass through a non-polarization beam splitter 16, and are separated by a polarization beam splitter 3 of the interferometer. The light beam $f_1$ passing straight through the polarization beam splitter 3 is reflected back by a measuring reflector 1. In this event, the light $f_1$ passes through a quarter wavelength plate 13 twice and therefore has the plane of polarization rotated by 90 degrees, so that the light beam $f_1$ is bent at this time by the polarization beam splitter 3 toward a corner cube prism 17, and further returns the same path and again impinges on the measuring reflector 1. Since the light reflected back to the polarization beam splitter 3 has the plane of polarization rotated further by 90 degrees, the light travels in the polarization beam splitter 3, at this time, to return to the laser light source LS. A portion of the returning light is separated by the non-polarization beam splitter 16 and incident on a photodetector 10.

The light beam $f_2$ first bent by the polarization beam splitter 3 by 90 degrees reciprocates twice between the interferometer and a measuring reflector 2. Specifically, the light beam $f_2$ led to the reflector 2 on the opposite side by three beam bender 4, 5, 6 is reflected by the reflector 2, subsequently returns along the same optical path, and passes through a quarter wavelength plate 14 twice, so that the returning light goes via the polarization beam splitter 3 to the corner cube prism 17, and then returns along the same path and again impinges on the measuring reflector 2, is reflected by the measuring reflector 2 to return again to the polarization beam splitter 3. Since the resulting light has the plane of polarization rotated further by 90 degrees, the light is bent by the polarization beam splitter 3 at this time and returns to the laser light source LS. A portion of the returning light is separated by the non-polarization beam splitter 16, and incident on the photodetector 10. This configuration provides the resolution four times as high as a single beam interferometer in a basic configuration.

Figure 7:
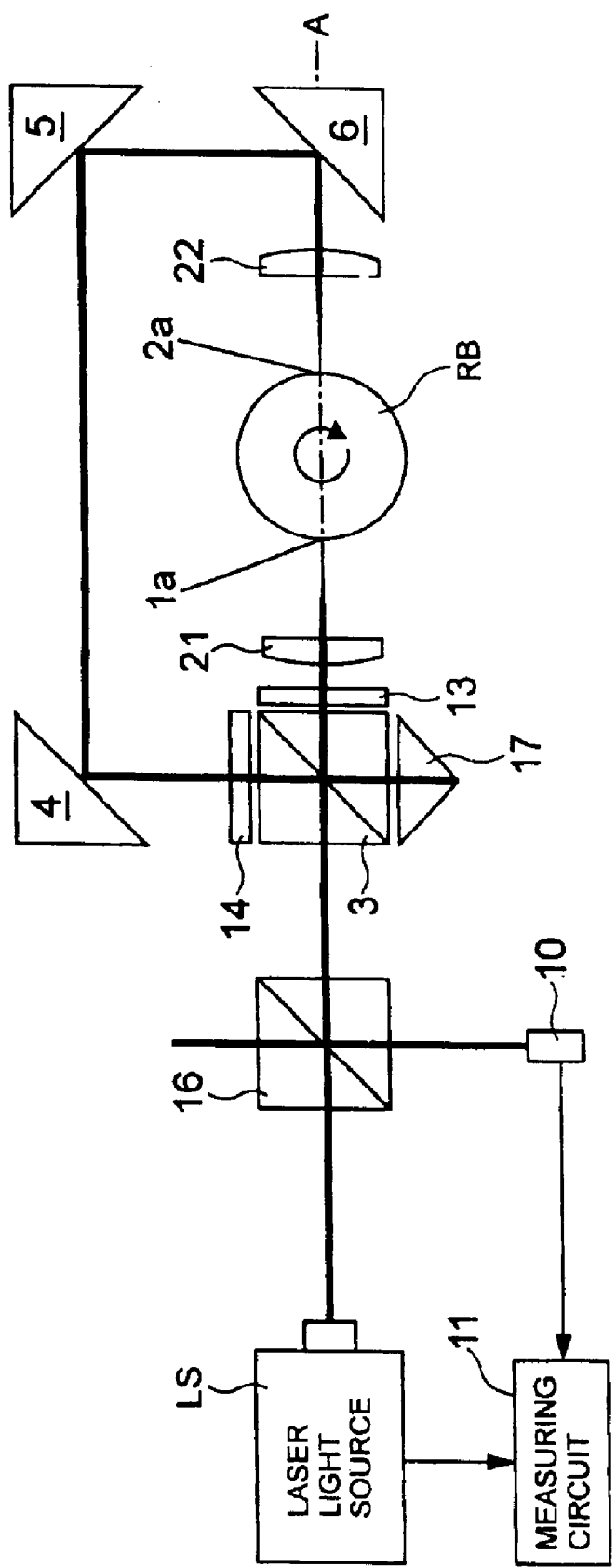

FIG. 7 illustrates a further exemplary modification for measuring run-out of the axis of rotation, to which the differential single beam two-pass interferometer is applied. Members indicated by the same reference numerals in FIGS.

7 and 6 are identical. In this exemplary modification, a measuring reflector is applied to columnar reflection planes 1a, 2a instead a measuring reflector is applied to columnar reflection planes 1a, 2a instead of an object B as a cylindrical rotor RB. The reflection planes 1a, 2a are side surfaces, arranged back-to-back to each other, of the rotor, the diameter of which is positioned on a measuring axis. The measuring axis is oriented to pass through the axis of rotation of the rotor. This interferometer is also configured such that both measuring light beams are co-axial near the center of the interferometer. Similar to the cat's eye configuration, the reflection planes have one point, respectively, so that converging lenses 21, 22 are co-axially positioned on either side of the rotor RB on the measuring axis for converging the measuring light. Also, this exemplary modification can measure a displacement of run-out of the axis of rotation of the rotor with the same optical paths and resolution as those described in connection with FIG. 6 (the reflectors 1, 2 are read for reflection planes 1a, 2a, respectively).

Figure 8:
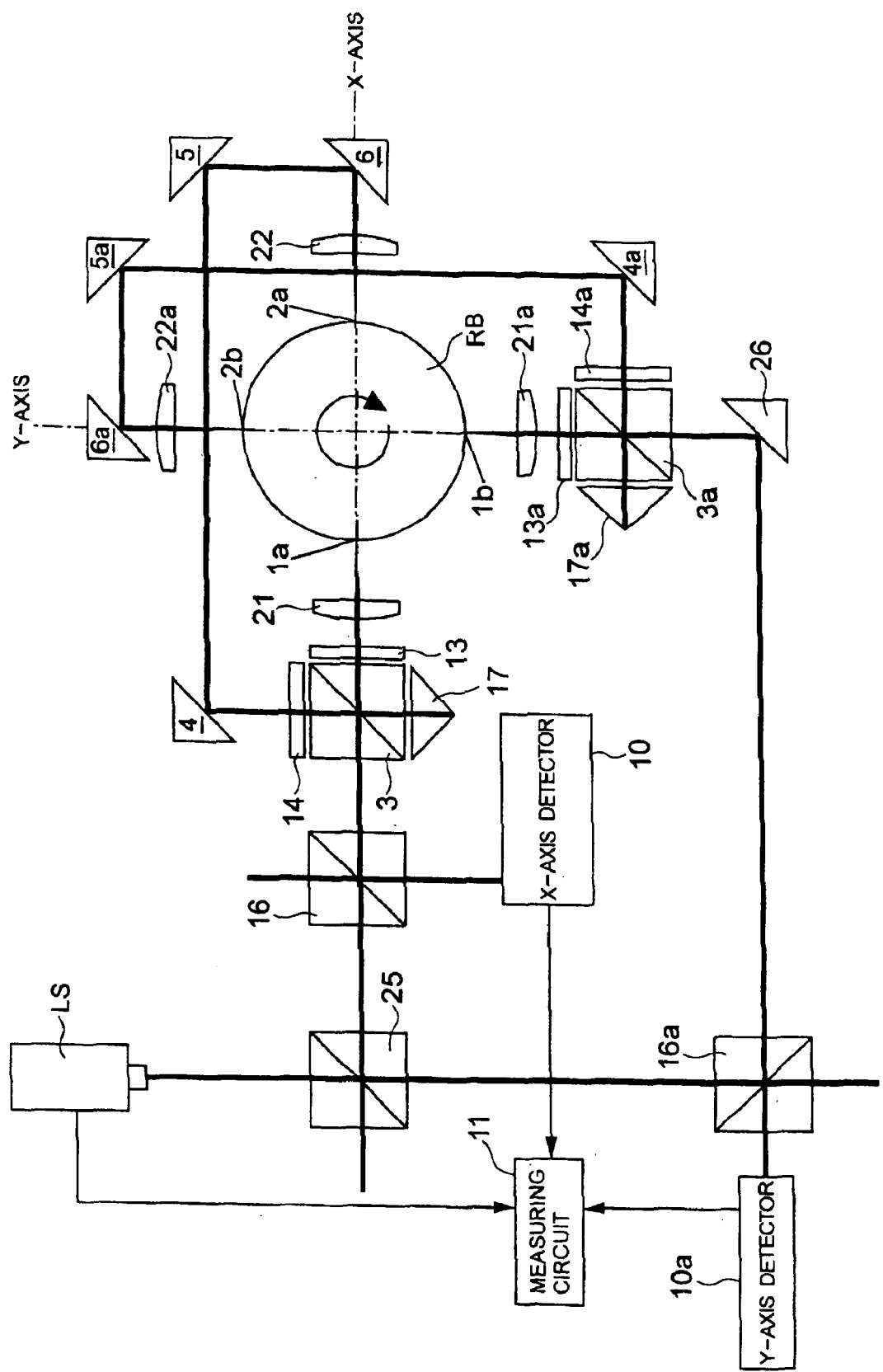

A component not synchronized with the rotation (non-repeatable component) extracted from the displacement of run-out of the axis of rotation of the rotor measured by the laser-based measuring apparatus is NRRO (Non Repetitive Run Out). NRRO is one of factors critical to the rotation accuracy of a spindle, and is a cause of deteriorating the recording position accuracy of an optical disk and a magnetic disk. Conventionally, NRRO of a spindle has been difficult to measure with a resolution equivalent to a four-pass interferometer. However, the measurement of NRRO becomes possible when using a method which applies the differential single beam two-pass interferometer as FIG. 8 further illustrates the configuration of the differential single beam two-pass interferometer illustrated in FIG. 7 which is applied to a measurement of run-out of axes of rotation of two orthogonal XY measuring axes. Likewise, this exemplary modification is capable of measuring a displacement of run-out of the axis of rotation of a rotor on each of the X-, Y-axes with the same optical paths and resolution as those described in connection with FIG. 6 (the reflectors 1, 2 are read for reflection planes 1a, 2a and 1b, 2b) by reflected light from the reflection planes 1a, 2a and 1b, 2b existing on common axes of the rotor RB. In this manner, a two-dimensional measurement of NRRO can be accomplished with a resolution equivalent to that of the conventional four-pass interferometer. A displacement of run-out of the axis of rotation in the X-axis direction illustrated in FIG. 8 is measured by an optical path comprising a non-polarization beam splitter 16, a polarization beam splitter 3, quarter wavelength plates 13, 14, beam benders 4, 5, 6, converging lenses 21, 22, and a photodetector 10, while a displacement of run-out of the axis of rotation in the Y-axis direction is measured by an optical path comprising a non-polarization beam splitter 16a, a relay beam bender 26, a polarization beam splitter 3a, quarter wavelength plates 13a, 14a, beam benders 4a, 5a, 6a, converging lenses 21a, 22a, and a photodetector 10a. An optical beam is supplied to the optical path of each axis by a non-polarization beam splitter 25 which splits a light beam from a laser light source LS to the X- and Y-axes.

Figure 9:
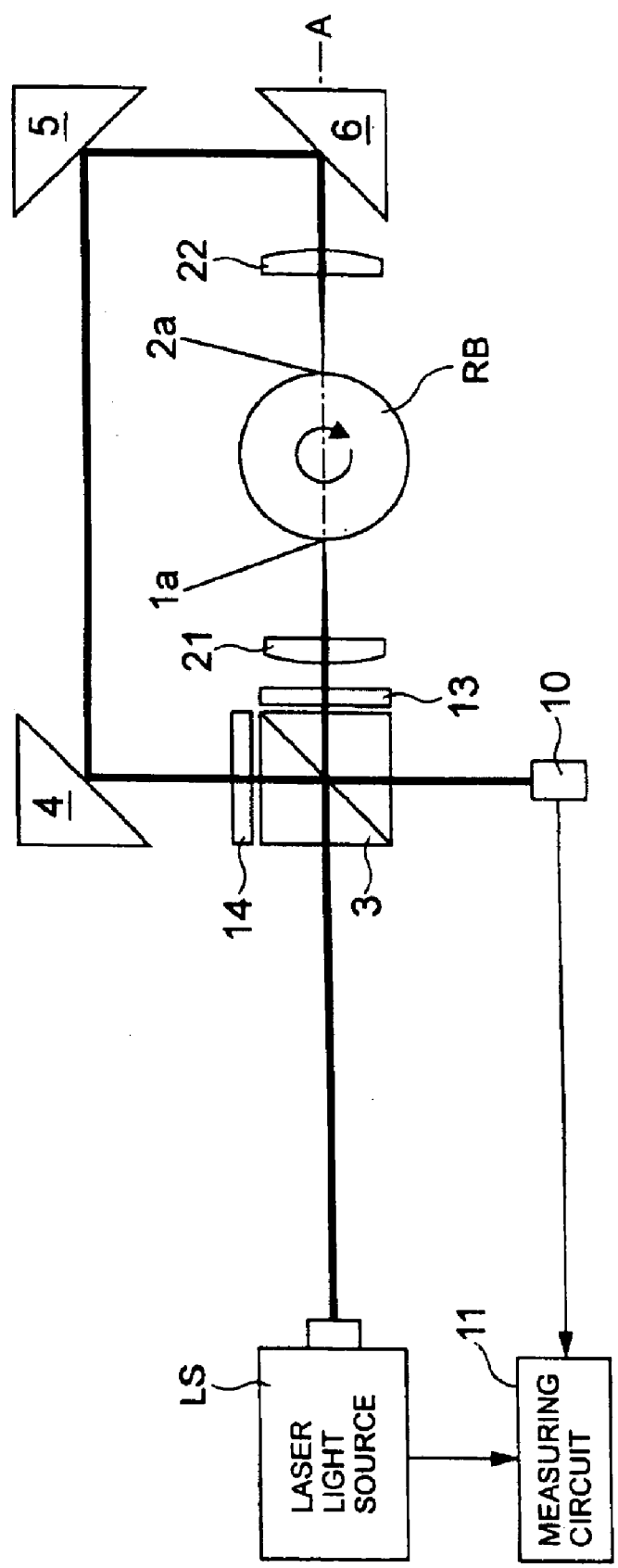

FIG. 9 illustrates the configuration of a single beam one-pass interferometer which is a modification to the single beam interferometer illustrated in FIG. 4 for making a differential measurement. Members indicated by the same reference numerals in FIGS. 9 and 4 are identical. This exemplary modification applies measuring reflectors to columnar reflection planes 1a, 2a as a cylindrical rotor RB in place of the object B. The reflection planes 1a, 2a are side portions, arranged back-to-back to each other, of a rotor, the diameter of which is positioned on a measuring axis. The measuring axis is positioned to pass the axis of rotation of the rotor. This interferometer is also configured such that both measuring light beams are co-axial near the center of the interferometer. Since the reflection planes have one point, respectively, so that converging lenses 21, 22 are co-axially positioned on either side of the rotor RB on the measuring axis for converging the measuring light. Also, this exemplary modification is capable of measuring a displacement of run-out of the axis of rotation of the rotor with the same optical paths and resolution as those described in connection with FIG. 4 (the reflectors 1, 2 are read for reflection planes 1a, 2a).

Figure 10:
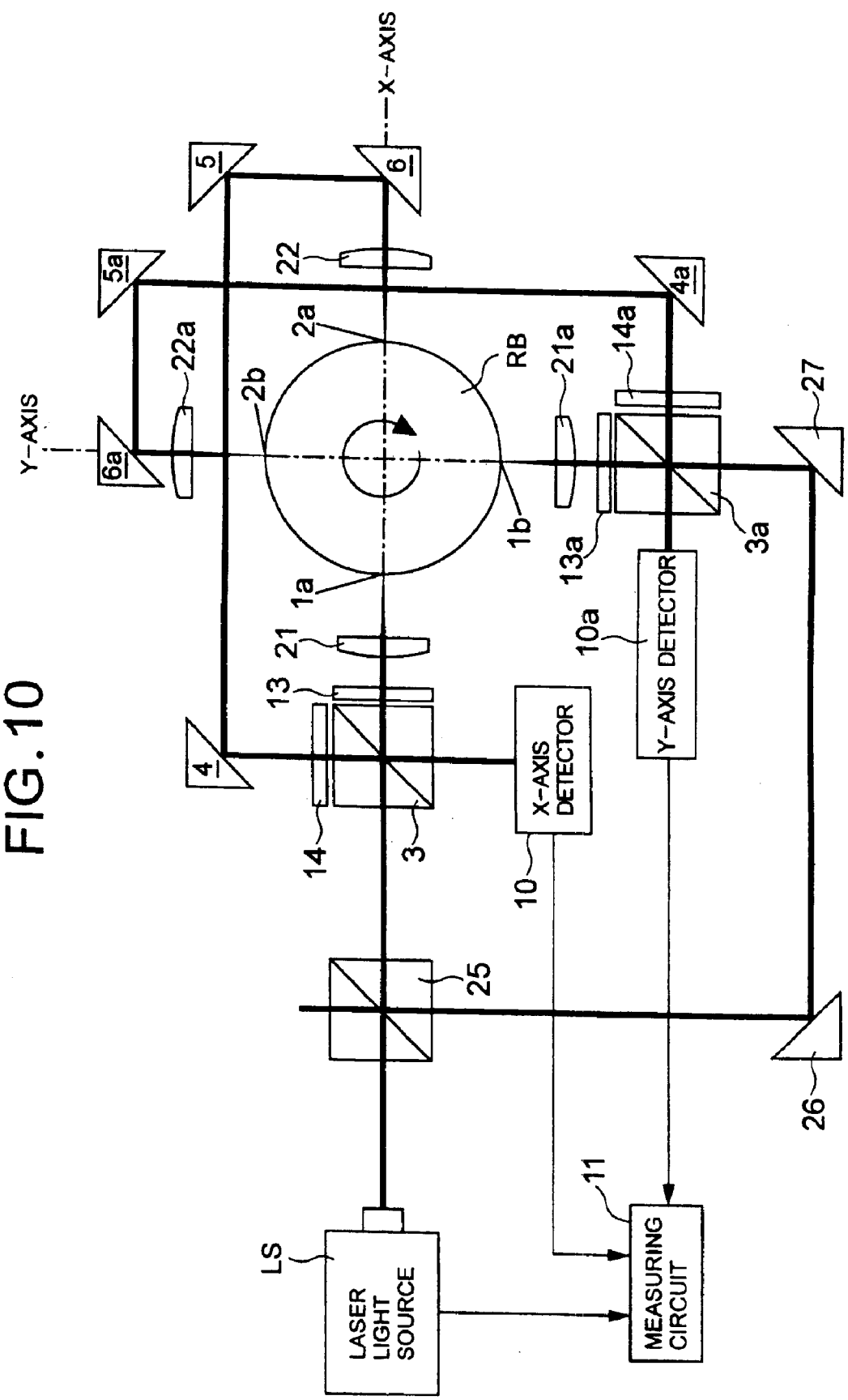

FIG. 10 illustrates the configuration of another one-pass configuration applied to a measurement of run-out of the axis of rotation, specifically, an application of the rotation run-out measurement illustrated in FIG. 9 to an orthogonal XY biaxial measurement. Likewise, this exemplary modification is capable of measuring a displacement of run-out of the axis of rotation of a rotor on each of the X-, Y-axes with the same optical paths and resolution as those described in connection with FIG. 4 (the reflectors 1, 2 are read for reflection planes 1a, 2a and 1b, 2b) by reflected light from the reflection planes 1a, 2a and 1b, 2b existing on the common axes of the rotor RB. A displacement of run-out of the axis of rotation in the X-axis direction illustrated in FIG. 10 is measured by an optical path comprising a polarization beam splitter 3, quarter wavelength plates 13, 14, beam benders 4, 5, 6, converging lenses 21, 22, and a photodetector 10, while a displacement of run-out of the axis of rotation in the Y-axis direction is measured by an optical path comprising relay beam benders 26, 27, a polarization beam splitter 3a, quarter wavelength plates 13a, 14a, beam benders 4a, 5a, 6a, converging lenses 21a, 22a, and a photodetector 10a. An optical beam is supplied to the optical path of each axis by a non-polarization beam splitter 25 which splits a light beam from a laser light source LS to the X- and Y-axes.

In the present invention, two reflectors or reflection planes are arranged back-to-back to each other on a measuring axis of an object, and are irradiated with measuring light from the opposite directions with respect to the measuring axis to differentially measure displacements in opposite phases to each other, so that the present invention can be applied irrespective to the type of interferometer. Also, since the present invention can be applied to a measurement of a small measuring reflection plane due to a limited space, and to a single beam interferometer for use with a measuring reflection plane other than plane mirror, such as a cylindrical plane, a spherical plane, and the like, measurements can be accomplished with a resolution maximally four times as high as a linear interferometer in these applications as well.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2001-10113 which is hereby incorporated by reference.

What is claimed is:

1. A laser-based measuring apparatus for measuring an axial run-out in a cylinder of rotation, comprising:
   a laser light source;
   a portion for generating at least two measuring light beams by dividing a light beam provided from the laser light source;
   a cylinder having an axis of rotation and cylindrical side surface portions opposing to each other on a diameter;
   a measuring axis positioned on the cylinder's diameter to pass through the axis of rotation of the cylinder;
   an opposing incident optical system for directing said two measuring light beams through separate optical paths into said cylindrical side surface portions, respectively, such that said two measuring light beams oppose to each other on said measuring axis, wherein said opposing incident optical system receives light beams reflected by said cylindrical side surface portions to recombine the reflected light beams so as to interfere with each other to generate interfered light;
   a photodetector for receiving the interfered light to generate a beat signal as the difference of optical frequencies by heterodyne detection; and
   a measuring circuit connected to the photodetector for calculating the axial run-out in the cylinder of rotation which changes an optical path length of a portion of an optical path based on the beat signal.

2. The laser-based measuring apparatus according to claim 1, wherein said measuring apparatus comprises a plurality of said opposing incident optical systems arranged around the cylinder.

3. The laser-based measuring apparatus according to claim 1, further comprising converging lenses which are co-axially positioned on both sides of the cylinder on the measuring axis for converging the measuring light beams.

4. A laser-based measuring method for measuring axial run-out in a cylinder of rotation, comprising the steps of:
   setting a cylinder having an axis of rotation and cylindrical side surface portions opposing to each other on a diameter such that said cylindrical side surface portions are arranged on a measuring axis extending in the cylinder's diameter;
   generating at least two measuring light beams by dividing a light beam provided from a laser light source;
   directing said measuring light beams through separate optical paths into said cylindrical side surface portions, respectively, such that said measuring light beams oppose to each other on said measuring axis;
   receiving light beams reflected by said cylindrical side surface portions to recombine the reflected light beams so as to interfere with each other to generate interfered light;
   photo-detecting the interfered light to generate a beat signal as the difference of optical frequencies by heterodyne detection; and
   calculating the axial run-out in the cylinder of rotation which changes an optical path length of a portion of an optical path based on the beat signal.

5. The laser-based measuring method according to claim 4, wherein a plurality of opposing incident optical systems are arranged around the cylinder.

6. The laser-based measuring method according to claim 4, further comprising a step of providing converging lenses which are co-axially positioned on both sides of the cylinder on the measuring axis for converging the measuring light beams.

* * * * *